(12) United States Patent
Tomoeda

(10) Patent No.: US 8,469,278 B2
(45) Date of Patent: Jun. 25, 2013

(54) INFORMATION STORAGE MEDIUM

(75) Inventor: Yuuki Tomoeda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 826 days.

(21) Appl. No.: 12/593,056

(22) PCT Filed: Feb. 27, 2008

(86) PCT No.: PCT/JP2008/053427
§ 371 (c)(1),
(2), (4) Date: Sep. 25, 2009

(87) PCT Pub. No.: WO2008/126491
PCT Pub. Date: Oct. 23, 2008

(65) Prior Publication Data
US 2010/0038435 A1    Feb. 18, 2010

(30) Foreign Application Priority Data
Mar. 29, 2007  (JP) ................................ 2007-086137

(51) Int. Cl.
*G06K 19/06* (2006.01)
*G06K 19/00* (2006.01)

(52) U.S. Cl.
USPC .......................................... 235/492; 235/487

(58) Field of Classification Search
USPC ......... 235/439, 441, 451, 492, 375, 380–382, 235/487
See application file for complete search history.

(56) References Cited

U.S. PATENT DOCUMENTS

| 5,286,962 A * | 2/1994 | Fujioka et al. ................ 235/492 |
| 2002/0169969 A1* | 11/2002 | Watanabe et al. ............. 713/190 |
| 2005/0033943 A1* | 2/2005 | Weiss ............................ 712/220 |

FOREIGN PATENT DOCUMENTS

| JP | 05-158745 | 6/1993 |
| JP | 09-160808 | 6/1997 |
| JP | 2002-334317 | 11/2002 |
| JP | 2005-509936 | 4/2005 |
| JP | 2005-285133 | 10/2005 |
| JP | 2007-004456 | 1/2007 |

* cited by examiner

*Primary Examiner* — Thien M Le
*Assistant Examiner* — April Taylor
(74) *Attorney, Agent, or Firm* — Pillsbury Winthrop Shaw Pittman, LLP

(57) ABSTRACT

An information storage medium is formed of a card main body having a module embedded therein, and the module includes communicating unit for receiving a command from an external device, storing unit for storing a data processing routine including a plurality of check points, and data processing unit for executing processing corresponding to the command in accordance with the data processing routine, storing a plurality of check flags having the same value that varies in accordance with use of the plurality of check points included in the data processing routine, and confirming validity of data processing based on the plurality of stored check flags.

4 Claims, 3 Drawing Sheets

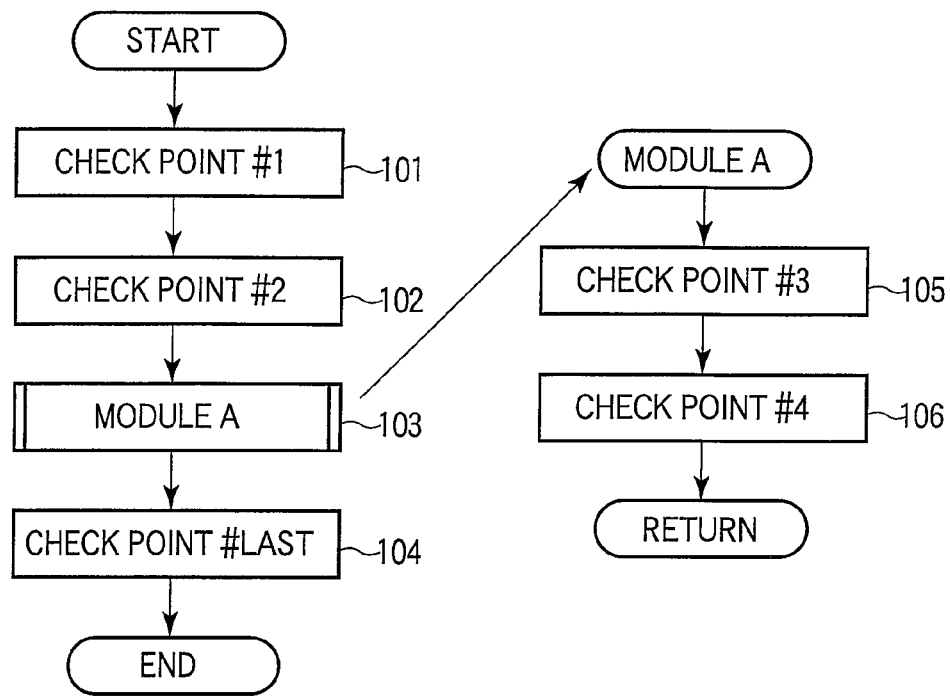
F I G. 3
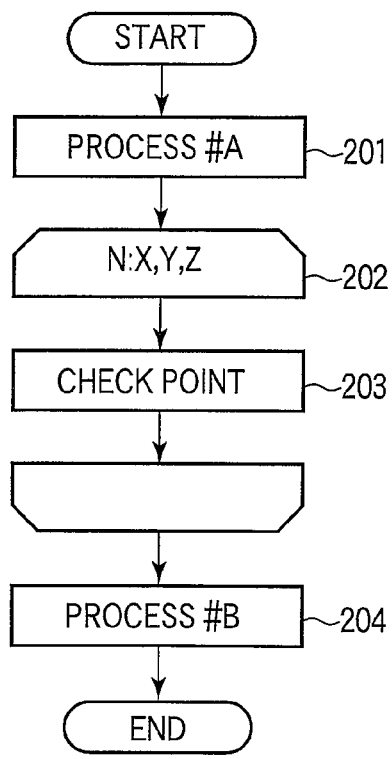
F I G. 4

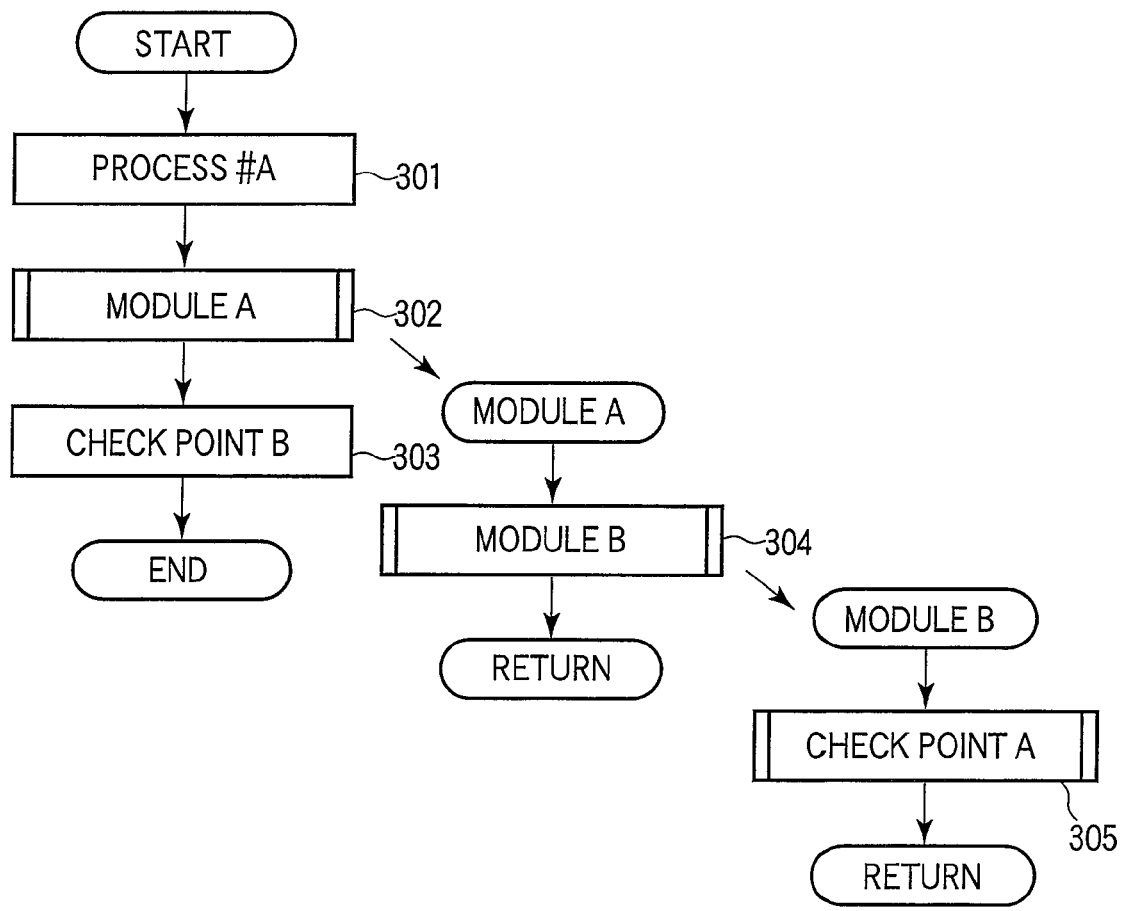
F I G. 5

INFORMATION STORAGE MEDIUM

CROSS-REFERENCE TO RELATED APPLICATIONS

This is the U.S. National Stage of PCT/JP2008/053427, filed Feb. 27, 2008, which in turn claims priority to Japanese Patent Application No. 2007-086137, filed Mar. 29, 2007, the entire contents of both applications are incorporated herein by reference in their entireties.

TECHNICAL FIELD

The present invention relates to an information storage medium called an IC card including a built-in IC (Integrated Circuit) chip having a CPU, an ROM, an RAM, an EEPROM, and others.

BACKGROUND ART

An IC (Integrated Circuit) card has been used for not only a credit card, a commutation ticket, account settlement of other business transactions but also used in various fields as an ID card, e.g., an employee ID card, a membership card, or a health insurance card. That is because the IC card includes an IC having a CPU, an ROM, an RAM, an EEPROM, and others to realize various functions as compared with a conventional magnetic card and counterfeiting the IC card is difficult, which greatly improves security.

ISO/IEC 7816-1 part 1, 2 discloses a structure of an IC card. For example, the IC card stores important information such as personal information. To assure security, the important information stored in the IC card is encrypted, and authentication with respect to an IC card user is requested.

However, a CPU may erroneously operate in some cases when noise is applied to a power or a clock supplied to the IC card or light is applied to an IC chip itself, and a countermeasure against a fraudulent transaction that intentionally provokes such an erroneous operation is desired. To realize this, a measure of mounting a filter that eliminates an influence of noise on an LSI itself is taken. However, this measure alone cannot sufficiently avoid an erroneous operation of the CPU.

Further, JP-A 2005-285133 (KOKAI) discloses a technology of detecting an erroneous operation to appropriately continue or stop processing in accordance with a type of the erroneous operation.

DISCLOSURE OF INVENTION

As explained above, when noise is applied to a power or a clock to be supplied during an operation of the card or a light is applied to a circuit in the IC chip, a command of the CPU jumps, and fraudulent processing or output may be possibly performed. The above-explained conventional technology alone cannot sufficiently avoid an erroneous operation of the CPU. Furthermore, when an algorithm of detecting an erroneous operation is caught on, fraudulence is accepted.

It is an object of the present invention to provide an information storage medium superior in avoidance of fraudulence.

An information storage medium according to the present invention is an information storage medium formed of a card main body having a module embedded therein, wherein the module comprises: communicating means for receiving a command from an external device; storing means for storing a data processing routine including a plurality of check points; and data processing means for executing processing corresponding to the command in accordance with the data processing routine, storing a plurality of check flags having the same value that varies in accordance with use of the plurality of check points included in the data processing routine, and confirming validity of data processing based on the plurality of stored check flags.

An information storage medium according to the present invention is an information storage medium formed of a card main body having a module embedded therein, wherein the module comprises: communicating means for receiving a command from an external device; storing means for storing a plurality of data processing routines each including at least one check point; and data processing means for executing processing corresponding to the command in accordance with the plurality of data processing routines, storing respective check flags having values that vary in accordance with use of the respective check points included the respective data processing routines, and confirming validity of data processing based on the respective stored check flags.

An information storage medium according to the present invention is an information storage medium formed of a card main body having a module embedded therein, wherein the module comprises: communicating means for receiving a command from an external device; storing means for storing a sub-routine including at least one check point and a main routine including the sub-routine and including at least one check point; and data processing means for executing data processing corresponding to the command in accordance with the sub-routine and the main routine, storing respective check flags having values that change in accordance with use of the respective check points included in the sub-routine and the main routine, and confirming validity of data processing based on the respective stored check flags.

An information storage medium according to the present invention is an information storage medium formed of a card main body having a module embedded therein, wherein the module comprises: communicating means for receiving a command from an external device; storing means for storing a data processing routine including loop processing; and data processing means for executing data processing corresponding to the command in accordance with the data processing routine, storing a value of the number of times of loop processing that varies along a predetermined rule in accordance with the number of times of loop processing included in the data processing, and confirming validity of the data processing based on the value of the number of times of loop processing.

An information storage medium according to the present invention is an information storage medium formed of a card main body having a module embedded therein, wherein the module comprises: communicating means for receiving a command from an external device; storing means for storing a data processing routine including loop processing, and data processing means for executing data processing corresponding to the command in accordance with the data processing routine, storing a check flag having a value that changes in accordance with use of a check point included in the loop processing, and confirming validity of data processing based on the stored check flag.

An information storage medium according to the present invention is an information storage medium formed of a card main body having a module embedded therein, wherein the module comprises: communicating means for receiving a command from an external device; storing means for storing a sub-routine in the lowermost layer, a sub-routine in an intermediate layer including the sub-routine in the lowermost layer, and a main routine including the sub-routine in the intermediate layer; and data processing means for executing data processing corresponding to the command in accordance with the main routine, the sub-routine in the intermediate layer, and the sub-routine in the lowermost layer, storing a check flag having a value that changes based on a call for the sub-routine in the lowermost layer, and confirming validity of the data processing based on the stored check flag.

An information storage medium according to the present invention is an information storage medium formed of a card main body having a module embedded therein, wherein the module comprises: communicating means for receiving a command from an external device; storing means for storing a plurality of sub-routines and a main routine including the plurality of sub-routines; and data processing means for executing data processing corresponding to the command in accordance with the main routine and the sub-routines, storing a plurality of check flags having values that change based on respective calls for the plurality of sub-routines, and confirming validity of the data processing based on the plurality of stored check flags.

BRIEF DESCRIPTION OF DRAWINGS

FIG. 3 is a flowchart for explaining an example of check point processing;

FIG. 4 is a flowchart for explaining an example of check point processing during loop processing; and FIG. 5 is a flowchart for explaining an example of check point processing in a sub-routine in a nested structure.

BEST MODE FOR CARRYING OUT THE INVENTION

An embodiment according to the present invention will now be explained hereinafter with reference to the accompanying drawings.

Figure 1:
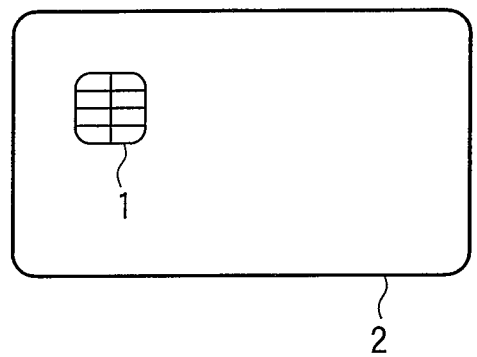
FIG. 1 is a drawing showing a general view of an information storage medium according to an embodiment.

FIG. 1 is a drawing showing a general view of an information storage medium according to this embodiment. As shown in FIG. 1, an information storage medium is formed of a card main body 2, and the card main body includes an IC chip 1 (a module).

Figure 2:
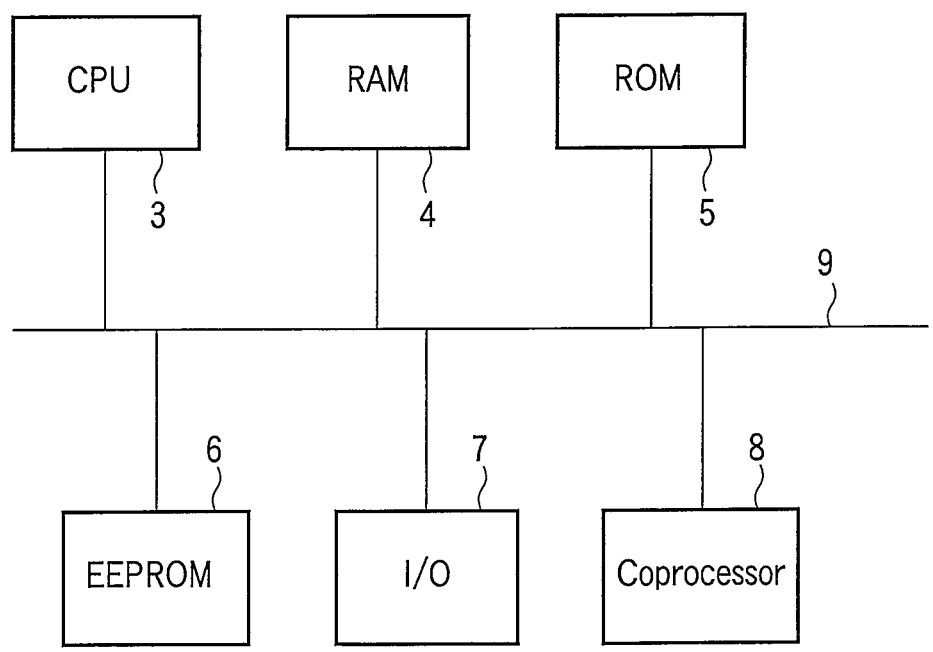
FIG. 2 is a view showing an outline structure of an IC chip.

FIG. 2 is a view showing an outline structure of the IC chip 1. As shown in FIG. 2, the IC chip 1 includes a CPU 3, an RAM 4, an ROM 5, an EEPROM 6, an I/O 7, a coprocessor 8, and a data bus 9.

The ROM 5 stores various kinds of programs (a data processing routine, a sub-routine, a main routine) of the IC card. The CPU 3 executes the various kinds or programs stored in the ROM 5, and checks whether the various kinds of programs have been correctly executed. An operation check performed by the CPU 3 will be explained later in detail. The RAM 4 and the EEPROM 6 store data required when executing the various kinds of programs by the CPU 3. The I/O 7 receives a command from an external device, e.g., an IC card reader/writer, and outputs a processing result as a response. The data bus 9 is a bus that is used to transfer data between the CPU 3, the RAM 4, the ROM 5, the EEPROM 6, the I/O 7, and the coprocessor 8.

The IC card stores important information such as personal information. To assure security, the important information stored in the IC card is encrypted, and authentication with respect to an IC card user is requested. However, when noise is applied to a power or a clock supplied to the IC card or when light is applied to an IC chip itself, the CPU may erroneously operate in some cases.

Therefore, the IC card according to this embodiment confirms whether original processing is correctly executed (whether a command of the CPU is fraudulently skipped due to a disturbance) on a software side. For example, a check point is provided at each position in a data processing routine, a check flag corresponding to the check point is stored, the check flag is checked during data processing (as needed) or at the end of data processing, proper execution of the original processing is confirmed, and then a processing result is output. Moreover, exercising an ingenuity with respect to an arrangement of the check points or a value (data) indicative of each check flag enables further securing reliability of data processing.

Specific examples will now be explained hereinafter.

1. The ROM 5 in the IC card stores a data processing routine including a plurality of check points, the I/O 7 receives a command from an external device, and the CPU 3 executes data processing corresponding to the command from the external device in accordance with the data processing routine. Here, the CPU 3 confirms whether the data processing is executed in accordance with the original correct data processing routine. That is, the CPU 3 stores a check flag whose value varies in accordance with progress of data processing (in accordance with checking at a check point), confirms whether a value of this check flag matches with an expected value during or at the end of the data processing, and outputs a processing result under conditions where these value match with each other.

Additionally, the following operation further secures reliability of the data processing.

1-1. The check points in the data processing routine are dispersed and arranged at a plurality of points rather than one point. A plurality of check flags having the same value which vary in accordance with checking at the plurality of check points are stored, and validity of the data processing is confirmed based on the plurality of stored check flags. That is, whether the plurality of check flags have the same value is checked (mirroring).

1-2. Each check point is provided in accordance with processing contents of the data processing routine. Each check flag having a value that varies in accordance with checking at each check point included in each data processing routine is stored, and validity of the data processing is confirmed based on each stored check flag.

1-3. Check points are provided in each of a sub-routine and a main routine including the sub-routine. The respective check flags whose values vary in accordance with checking at the respective check points included in each of the routines are stored, and validity of the data processing is confirmed based on the respective stored check flags.

1-4. The check flags are increased or decreased by incrementing or decrementing values of the check flags in accordance with checking at the check points, and believability of the data processing is finally confirmed based on a total value of the values of the check flags. Alternatively, check flags that are updated by a value of a multiple other than 1 in accordance with checking at the check points are stored. For example, check flags that are updated by not only a multiple but also a general numerical sequence may be stored.

1-5. Alternatively, check flags that are updated by a randomly selected fixed value (a prepared value from, e.g., a table in advance) in accordance with checking at the check points are stored.

1-6. Alternatively, check flags that are updated by not only a static random number but also a value of a dynamic random number that fluctuates every time the data processing advances in accordance with checking at the check points are stored.

1-7. The check flags are updated in accordance with checking at the check points and all the check flags are confirmed at the end of the data processing. Alternatively, the check flags are confirmed in accordance with checking at the check points and then the check flags are updated.

2. The ROM 5 of the IC card stores a data processing routine including loop processing, the I/O 7 receives a command from the external device, and the CPU 3 executes data processing corresponding to the command from the external device in accordance with the data processing routine. Further, the CPU 3 increments or decrements a count value of the loop processing in accordance with execution of the loop processing.

Additionally, the following operation further secures reliability of the data processing.

2-1. A loop processing count value that varies in compliance with predetermined rules is stored to confirm validity of the data processing based on the loop processing count value rather than simply incrementing or decrementing the loop processing count value in accordance with execution of the loop processing (in accordance with the number of times of the loop processing).

2-2. A plurality of numerical sequences are held as a table, and selecting different numerical sequence every time realizes storing a loop processing count value that is updated by the selected numerical sequence in accordance with the number of times the loop processing.

2-3. A plurality of variables are held as a table, and selecting a different variable every time realizes storing a loop processing count value that is updated by the selected a progression in accordance with the number of times of the loop processing.

2-4. A function of 2-1 or 2-2 or functions of both 2-1 and 2-2 are provided with respect to the condition of 2-3.

3. The ROM 5 of the IC card stores a data processing routine, the I/O 7 receives a command from an external device, and the CPU 3 executes data processing corresponding to a command from the external device in accordance with the data processing routine. Here, the CPU 3 uses a hierarchical sub-routine call to confirm whether the processing up to the sub-routine in the lowermost layer has been properly executed in the uppermost portion where the call is made.

3-1. A check flag whose value varies based on a call for a sub-routine in the lowermost layer is stored, and validity of the data processing is confirmed based on this check flag. For example, a sub-routine in the lowermost layer, a sub-routine in an intermediate layer including this sub-routine in the lowermost layer, and a main routine including this sub-routine in the intermediate layer are defined, a check flag whose value varies based on a call for the sub-routine in the lowermost layer is stored, and validity of the data processing is confirmed based on this check flag.

3-2. A plurality of check flags whose values vary based on respective calls for a plurality of sub-routines are stored, and validity of the data processing is confirmed based on the plurality of stored check flags. That is, whether all sub-routines are called can be checked (called sub-routines and non-called sub-routines can be identified).

3-3. Values of the check flags are dispersed and stored at a plurality of positions (mirroring). That is, the plurality of check flags having the same value that varies based on a call for one sub-routine are stored, and validity of the data processing is confirmed based on the stored check flags having the same value.

3-4. The check flags are separated in accordance with each sub-routine call group to be used, and storage positions are changed.

3-5. The check flags that are updated by a value of a multiple other than 1 (which is a general numerical sequence without being restricted to a multiple) rather than the check flags having values updated by simple increment or decrement in accordance with a call for a sub-routine are stored.

3-6. The check flags that are updated by a randomly selected fixed value (a value prepared in, e.g., a table in advance) in accordance with a call for a sub-routine are stored.

3-7. The check flags that are updated by a dynamic random number value which fluctuates every time the card is processed rather than a static random number in accordance with a call for a sub-routine call are stored.

3-8. The check flags that are updated by a value of a stack pointer or a part of this value in accordance with a call for a sub-routine are stored.

An operational example of the check flags will now be explained hereinafter with reference to flowcharts depicted in FIGS. 3 to 5.

As shown in FIG. 3, check point processing is inserted into an important part in an original processing flow of the card. A check flag of one byte assured in the RAM 4 is updated (e.g., incremented or decremented) at a check point #1 (101) and a check point #2 (102) in a main routine. Likewise, the check flag of one byte assured in the RAM 4 is updated (e.g., incremented or decremented) at a check point #3 (105) and a check point #4 (106) in a sub-routine.

At a last check point #LAST (104) in the main routine, a value of the check flag is confirmed. The value of the check flag matches with an expected value if the original processing route is used, and the value of the check flag does not match with the expected value if the original processing route is not used. When these values do not match with each other, an error is returned or processing by the CPU 3 is stopped.

Here, the check flag may be dispersed and stored at a plurality of positions. That is, the plurality of check flags may be set in the RAM 4 or may be simultaneously stored in different memories, e.g., a register, the EEPROM 6, and others. Further, the check point processing may be divided into a plurality of parts (in accordance with, e.g., each module) to store the respective check flags in different regions. Furthermore, the value of the check flag may be increased or decreased by using a value of any multiple rather than simply incrementing or decrementing the value of the check flag. Moreover, as explained above, although the check flag is checked at the last check point #LAST (104), the check flag may be checked at the respective check points #1 (101), #2 (102), #3 (103), and #4 (104). In this case, an expected value is required at each check point, but more secure checking can be performed by providing a given determined irregular value rather than regularly changing the check flag. Additionally, this irregular value may be changed each time by using a value of a random number without being fixed.

As shown in FIG. 4, a check point (203) is arranged in the loop processing. A value of the check flag is updated (e.g., incremented or decremented) in accordance with the number of times of loop processing (in accordance with checking at the check point). Alternatively, a value of the check point is increased/decreased by using a value of a multiple rather than 1. Based on this operation, whether a value of the check point is a set multiple is checked in the loop processing to confirm whether the value of the check point is correct. Further, changing an increment/decrement value every time the loop processing is executed is also effective. Furthermore, providing the plurality of variables of the increment/decrement value rather than providing one variable of the increment/decrement value enables securely avoiding falsification of the number of times of loop. The above-explained methods can be combined with the plurality of variables.

As shown in FIG. 5, it is assumed that a main routine in the uppermost layer (301 to 303), a sub-routine in an intermediate layer (304), and a sub-routine in the lowermost layer (305) are present. A dedicated check flag is stored in accordance with a call for the sub-routine in the lowermost layer (at a check point A in the sub-routine in the lowermost layer). After returning to the main routine in the uppermost layer (at a check point B in the main routine in the uppermost layer), the dedicated check flag is checked to confirm whether the sub-routine in the lowermost layer is called.

Alternatively, check points are respectively provided to the plurality of sub-routines, and values of the check flags are changed when the plurality of sub-routines are respectively called. After returning to the main routine in the uppermost layer, a value of the check flag is checked to confirm whether this value matches with an expected value. Moreover, the check flag may be stored at a plurality of positions rather than one position. Additionally, different check flags may be separately prepared in accordance with each of such continuous sub-routine call groups. Further, this check flag may be changed to any other regular value rather than being increased/decreased by increment/decrement. Alternatively, an irregular value rather than a regular value may be used. Whether the processing has reached the module in the lowermost layer may be checked by using a value of a stack pointer rather than the check flag.

This embodiment will now be summarized hereinafter.

(1) In the IC card which holds data therein, executes processing in accordance with a command from the outside, and outputs a result, the IC card having a check point processing section at each point in a processing flow in order to confirm whether the processing has been executed in accordance with the proper processing flow to obtain a result satisfying a demand from the outside and having a function of changing a value of a check flag that is used to confirm validity of the processing flow in this check point processing section and confirming a final result of the check flag at the end of the processing to confirm validity of the processing, the check flag is dispersed and stored at a plurality of positions (mirroring).

(2) In the IC card which holds data therein, executes processing in accordance with a command from the outside, and outputs a result, the IC card having a check point processing section at each point in a processing flow in order to confirm whether the processing has been executed in accordance with the proper processing flow to obtain a result satisfying a demand from the outside and having a function of changing a value of a check flag that is used to confirm validity of the processing flow in this check point processing section and confirming a final result of the check flag at the end of the processing to confirm validity of the processing, the individual check flags are individually provided in accordance with processing contents rather than providing one check flag in the entire processing of the card, and the check flags are stored in different regions.

(3) In the IC card which holds data therein, executes processing in accordance with a command from the outside, and outputs a result, the IC card having a check point processing section at each point in a processing flow in order to confirm whether the processing has been executed in accordance with the proper processing flow to obtain a result satisfying a demand from the outside and having a function of changing a value of a check flag that is used to confirm validity of the processing flow in this check point processing section and confirming a final result of the check flag at the end of the processing to confirm validity of the processing, not only increment or decrement but also a multiple other than 1 (which is not restricted to a multiple and it may be a general numerical sequence) is used as an increment/decrement (change) value of the check flag.

(4) In the IC card which holds data therein, executes processing in accordance with a command from the outside, and outputs a result, the IC card having a check point processing section at each point in a processing flow in order to confirm whether the processing has been executed in accordance with the proper processing flow to obtain a result satisfying a demand from the outside and having a function of changing a value of a check flag that is used to confirm validity of the processing flow in this check point processing section and confirming a final result of the check flag at the end of the processing to confirm validity of the processing, a fixed value (a value prepared in, e.g., a table in advance) that is randomly selected in advance and held in the card is used as an increment/decrement (change) value of the check flag.

(5) In the IC card which holds data therein, executes processing in accordance with a command from the outside, and outputs a result, the IC card having a check point processing section at each point in a processing flow in order to confirm whether the processing has been executed in accordance with the proper processing flow to obtain a result satisfying a demand from the outside and having a function of changing a value of a check flag that is used to confirm validity of the processing flow in this check point processing section and confirming a final result of the check flag at the end of the processing to confirm validity of the processing, an increment/decrement (change) value of the check flag is fluctuated every time the processing of the card is executed.

(6) In the IC card which holds data therein, executes processing in accordance with a command from the outside, and outputs a result, the IC card having a check point processing section at each point in a processing flow in order to confirm whether the processing has been executed in accordance with the proper processing flow to obtain a result satisfying a demand from the outside and having a function of changing a value of a check flag that is used to confirm validity of the processing flow in this check point processing section and confirming a final result of the check flag at the end of the processing to confirm validity of the processing, not only a value of the check flag is changed in the check point processing section but also a value of the check flag is confirmed, and error processing is executed as required.

(7) In the IC card which holds data therein, executes processing in accordance with a command from the outside, and outputs a result, not only increment/decrement but also a value of a multiple other than 1 (which is not restricted to a multiple and may be a general numerical sequence) is used as an increment/decrement value for counting the number of times of loop processing that is required to performed repetitive processing.

(8) In the IC card which holds data therein, executes processing in accordance with a command from the outside, and outputs a result, a value that differs every time by selecting one from a plurality of numerical sequences held in the card in advance rather than a value that is the same every time is used as an increment/decrement value for counting the number of times of loop processing that is required to perform repetitive processing.

(9) In the IC card which holds data therein, executes processing in accordance with a command from the outside, and outputs a result, a plurality of variables for increment/decrement for counting the number of times of loop processing that is required to perform repetitive processing are provided, and a predetermined number of times is satisfied by all the variables to terminate the loop processing.

(10) In the IC card which holds data therein, executes processing in accordance with a command from the outside, and outputs a result, the check point processing section that changes the check flag required to confirm validity of the number of times of loops is provided in the loop processing that is required to perform repetitive processing, and whether the loop processing is performed for the correct number of times is finally confirmed by using a value of the check flag held in the card after the loop processing.

(11) In the IC card which holds data therein, executes processing in accordance with a command from the outside, and outputs a result, the check point processing section that changes the check flag that is used to confirm whether the sub-routine in the lowermost layer is called is provided in this sub-routine in order to confirm whether processing is performed up to the sub-routine in the lowermost layer with respect to the processing section where a sub-routine call has a nested structure, and a function of confirming a value of the check flag in the processing in the uppermost layer is provided.

(12) In the IC card which holds data therein, executes processing in accordance with a command from the outside, and outputs a result, the check point processing section that changes the check flag that is used to confirm whether each sub-routine is called is provided in the sub-routine in each hierarchical layer in order to confirm whether processing is properly performed up to the sub-routine in the lowermost layer with respect to the processing section where a sub-routine call has a nested structure, and a function of confirming a final value of the check flag in the processing in the uppermost layer is provided.

(13) In the IC card explained in (11) or (12), a value of the check flags is stored in a plurality of storage positions to perform mirroring.

(14) In the IC card explained in (11) or (12), different check flags are provided in accordance with respective hierarchical sub-routine groups, and the check flags are stored in a plurality of different storage positions.

(15) In the IC card explained in (11) or (12), not only increment/decrement but also a multiple other than 1 (which is not restricted to a multiple and may be a general numerical sequence) is used as an increment/decrement value for a value of the check flag.

(16) In the IC card explained in (11) or (12), a fixed value (a value prepared in, e.g., a table in advance) that is randomly selected in advance and held in the card is used as an increment/decrement (change) value for a value of the check flag.

(17) In the IC card explained in (11) or (12), an increment/decrement (change) value for a value of the check flag is fluctuated every time the processing of the card is executed.

(18) In the IC card explained in (11), a value of a stack pointer or a part of this value is utilized as an increment/decrement (change) value for a value of the check flag.

It is to be noted that the present invention is not restricted to the foregoing embodiments and can be modified in many ways without departing from the scope of the invention on an embodying stage. Further, the respective embodiments may be appropriately combined and carried out as long as possible, and combined effects can be obtained in this case. Furthermore, the foregoing embodiments include inventions on various stages, and various inventions can be extracted based on appropriate combinations of a plurality of disclosed constituent elements. For example, even if several constituent elements are eliminated from all constituent elements disclosed in the embodiments, a structure from which the constituent elements are eliminated can be extracted as the invention when the problem explained in the section "Problem to be Solved by the Invention" can be solved and the effect explained in the section "Effect of the Invention" can be obtained.

INDUSTRIAL APPLICABILITY

According to the present invention, the information storage medium superior in avoidance of fraudulence can be provided.

The invention claimed is:

1. An information storage medium formed of a card main body having a module embedded therein, wherein the module comprises:
communicating means for receiving a command from an external device;
storing means for storing a plurality of data processing routines each including at least one check point; and
data processing means for executing processing corresponding to the command in accordance with the plurality of data processing routines including a predetermined data processing routine, storing respective check flags having values that vary in accordance with use of the respective check points included the respective data processing routines, storing a dedicated check flag having a value that changes based on a call for the predetermined data processing routine, and confirming validity of data processing by comparing the values of the stored check flags and the dedicated check flag with a predetermined expected value,
wherein the storing means stores a sub-routine in the lowermost layer, a sub-routine in an intermediate layer including the subroutine in the lowermost layer, and a main routine including the sub-routine in the intermediate layer, and
wherein the data processing means executes data processing corresponding to the command in accordance with the main routine, the sub-routine in the intermediate layer, and the sub-routine in the lowermost layer, stores dedicated check flag having the value that changes based on the call for the sub-routine in the lowermost layer, and confirms validity of data processing by comparing the value of the stored check flag with the predetermined expected value.

2. An information storage medium formed of a card main body having a module embedded therein, wherein the module comprises:
communicating means for receiving a command from an external device;
storing means for storing a plurality of data processing routines each including at least one check point; and
data processing means for executing processing corresponding to the command in accordance with the plurality of data processing routines including a predetermined data processing routine, storing respective check flags having values that vary in accordance with use of the respective check points included the respective data processing routines, storing a dedicated check flag having a value that changes based on a call for the predetermined data processing routine, and confirming validity of data processing by comparing the values of the stored check flags and the dedicated check flag with a predetermined expected value, wherein the storing means stores a plurality of sub-routines and a main routine including the plurality of sub-routines, and wherein the data processing means executes data processing corresponding to the command in accordance with the main routine and the sub-routines, stores a plurality of check flags having values that change based on respective calls for the plurality of sub-routines, and confirms validity of the data processing by comparing the value of the stored check flags with the predetermined expected value.

3. The information storage medium according to claim 2, wherein the data processing means stores a plurality of check flags having the same value that changes based on a call for one sub-routine, and confirms validity of data processing by comparing the value of the stored check flag with the predetermined expected value.

4. The information storage medium according to claim 2, wherein the data processing means assigns different check flags in accordance with respective sub-routine groups, and stores the check flags at different storage positions.

* * * * *